J. C. LARSEN.
ANIMAL TRAP.
APPLICATION FILED MAY 6, 1912.

1,058,873.

Patented Apr. 15, 1913.

WITNESSES:
A. E. Carlsen
M. M. Carlsen

INVENTOR:
John C. Larsen
BY HIS ATTORNEY:
A. M. Carlsen

UNITED STATES PATENT OFFICE.

JOHN C. LARSEN, OF VELVA, NORTH DAKOTA.

ANIMAL-TRAP.

1,058,873.

Specification of Letters Patent.  Patented Apr. 15, 1913.

Application filed May 6, 1912. Serial No. 695,327.

*To all whom it may concern:*

Be it known that I, JOHN C. LARSEN, a citizen of the United States, residing at Velva, in the county of McHenry and State of North Dakota, have invented a new and useful Animal-Trap, of which the following is a specification.

My invention relates to improvements in self-setting animal traps, and the object is to provide a simple but efficient trap for catching gophers, moles and other rodents which have a fondness for traveling through ducts and tunnels whether dug by themselves or by other animals or produced by human efforts.

Figure 1:
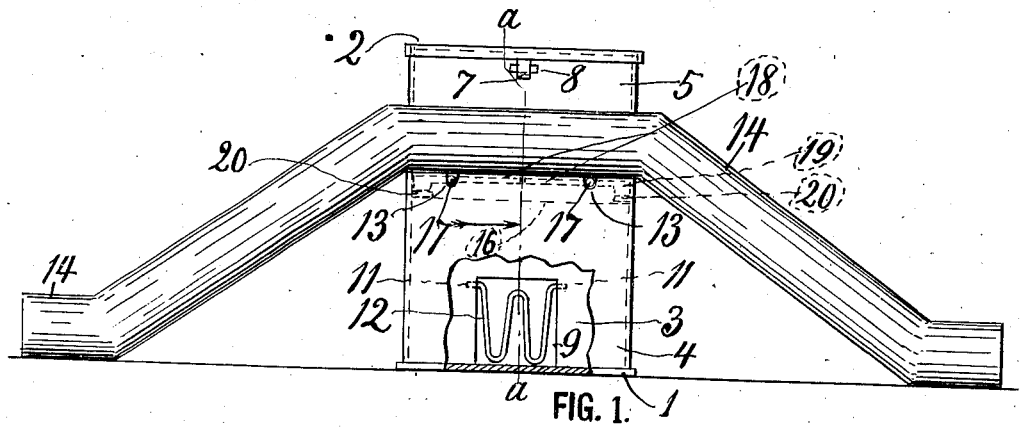
Figure 2:
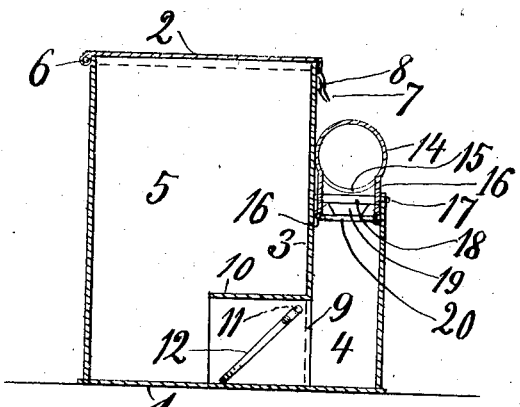
Figure 3:
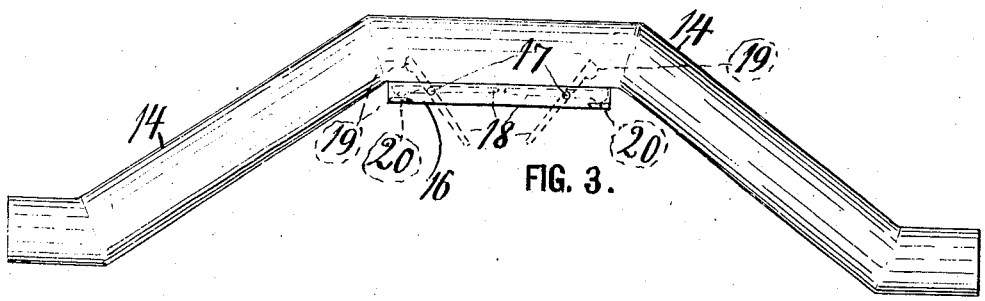

In the accompanying drawing,—Figure 1 is a front elevation of my complete animal trap shown as standing upon the ground and having a piece broken away in its front wall so as to expose a gate in the interior of the trap. Fig. 2 is a vertical section on the line $a-a$ of Fig. 1. Fig. 3 is a front view of the tube or tunnel 14 removed from the catching compartment of the trap.

Referring to the drawing by reference numerals, a receptacle having a bottom 1 and a cover 2 is divided by a partition 3 into a catching compartment 4 and a storing compartment 5, of which the latter is preferably higher and much larger than the former. The cover or lid 2 may preferably be hinged at 6 and provided with a spring catch 7 taking over a lug 8 on the compartment 5.

In the lower part of the partition 3 is an opening 9 with a duct 10 extending therefrom into the compartment 5, and in the sides of said duct is pivotally mounted at 11 a gate 12, which by its own weight is normally kept closed, as shown. The catching compartment 4 has its top open and provided with notches 13. Resting upon said compartment is an arched or double-inclined tube 14, constituting a tunnel or run-way for the animals to try to run through. At the middle of the tube is a large downward opening 15, having side flanges 16 guided into the top opening of the catching compartment. In said flanges are journaled the pivots 17 of two tilting platforms 18, each of which is counterbalanced to level position by a weight 19 resting upon a support 20. As it would be difficult to make the pivots or trunnions 17 short enough to clear the front wall of the catching chamber, the latter is provided with the notches 13 as clearings for the trunnions.

In operation, the trap being set in places frequented by the animals, the animals are attracted by the open ends of the tunnel 14 as desirable hiding places, and after entering the tunnel the animal will soon attempt an exploration trip through the tunnel, and reaching the tilting platforms 18, is there precipitated into the catching chamber 4, after which the weights 19 restore the platforms to normal position. The animal seeking to escape passes through the opening 9, the only exit, and raising the gate 12, passes into the compartment 5, after which the gate 12 will fall to the closed position shown in the drawing and the return of the animal to compartment 4 prevented. In said manner a great number of animals, especially gophers, may be caught and stored into the compartment 5 and are then removed from there in any suitable manner with or without first drowning or otherwise killing them. While the trap may thus be set and used as described upon the ground or upon a cellar floor or other surface, it is obvious that in catching pocket gophers or other wary animals which keep mostly in their underground run-ways, the trap may be slightly lowered into the ground until the ends of the tunnel 14 get into line with the run-ways in the ground. I may also make some of the traps with the tunnel sufficiently arched to let its ends below the surface of the ground while the rest of the trap stands upon the surface.

What I claim is:—

1. A self setting and ever-set animal trap comprising a receptacle having a vertical partition dividing it into a small and a large compartment, said partition having an opening and a duct extending therefrom into the large compartment, a gate trunnioned in the sides of the duct and adapted to be closed by its own weight, said smaller compartment having an opening in its top, an arched tunnel or tube resting upon said compartment and having a downward opening with vertical flanges. guiding in the opening of the compartment, one or more counterbalanced tilting platforms trunnioned in said flanges, and means arranged to support the tilting platforms in horizontal position.

2. A self setting and ever-set animal trap comprising a receptacle having a vertical partition dividing it into a small and a large compartment, said partition having an opening and a duct extending therefrom into the large compartment, a gate trunnioned in the sides of the duct and adapted to be closed by its own weight, said smaller compartment having an opening in its top, an arched tunnel or tube resting upon said compartment and having a downward opening with vertical flanges guiding in the opening of the compartment, one or more counterbalanced tilting platforms trunnioned in said flanges, and means arranged to support the tilting platform in a horizontal position; said small compartment being lower than the large compartment, whereby the middle portion of the arched tunnel is given a lateral support against the side of the large compartment.

3. A self-setting and ever-set animal trap comprising a storing compartment and a catching compartment separated by a vertical partition having an opening, a self-closing gate in said opening; the catching compartment having a large opening in its top and clearing notches adjacent said opening; a tunnel resting upon said catching chamber and having one or both ends inclined downward for the animals to enter same, said tunnel having a lateral downward opening with flanges projecting downward into the opening in the top of the catching compartment, tilting platforms mounted in said flanges by trunnions extending therethrough and into the adjacent clearings in the top edges of the compartment, means for turning the platforms to horizontal position, and means for supporting them in the said position.

In testimony whereof I affix my signature, in presence of two witnesses.

JOHN C. LARSEN.

Witnesses:
  RUFUS TREE,
  HENRY PETERSON.